US012656500B2

(12) United States Patent
Tapia et al.

(10) Patent No.: US 12,656,500 B2
(45) Date of Patent: Jun. 16, 2026

(54) DETECTING ADVERSE WEATHER CONDITIONS AT A LIDAR SENSOR LEVEL

(71) Applicant: GM CRUISE HOLDINGS LLC, San Francisco, CA (US)

(72) Inventors: Daniel Flores Tapia, Fairfield, CA (US); Rebekah Brandt, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 937 days.

(21) Appl. No.: 17/951,507

(22) Filed: Sep. 23, 2022

(65) Prior Publication Data

US 2024/0111058 A1     Apr. 4, 2024

(51) Int. Cl.
G01S 17/95      (2006.01)
G01S 7/48       (2006.01)
G01S 7/4861     (2020.01)
G01S 17/10      (2020.01)

(52) U.S. Cl.
CPC ............ G01S 17/95 (2013.01); G01S 7/4802 (2013.01); G01S 7/4861 (2013.01); G01S 17/10 (2013.01)

(58) Field of Classification Search
CPC .................................. G01S 17/95; G01S 17/42
See application file for complete search history.

(56) References Cited

U.S. PATENT DOCUMENTS

2009/0248336 A1*  10/2009  Afgani ................... G01R 23/20
                                                                702/69
2011/0246116 A1*  10/2011  Kamitani ................. G01C 3/00
                                                                702/159
2016/0294492 A1*  10/2016  Mostofi ................ H04B 17/318
2020/0166649 A1*   5/2020  Terefe ..................... G01S 17/86
2024/0201391 A1*   6/2024  Zhang ................... G01S 7/4873

* cited by examiner

*Primary Examiner* — Christopher D Hutchens
(74) *Attorney, Agent, or Firm* — CANTOR COLBURN LLP

(57)     ABSTRACT

Disclosed are systems and methods for detecting weather conditions at a LiDAR sensor level. In some aspects, a method includes calculating a reference probability mass function (PMF) of at least one field of a point cloud generated from reference scene responses received from a light detection and ranging (LiDAR) sensor; calculating a current PMF for the at least one field of the point cloud generated from a current scene response received from the LiDAR sensor; determining a statistical difference between the reference PMF and the current PMF using a Kullbeck-Leibler (KL) divergence calculation; and responsive to the statistical difference satisfying a threshold for the at least one field, flagging an environmental change in the current scene response.

20 Claims, 7 Drawing Sheets

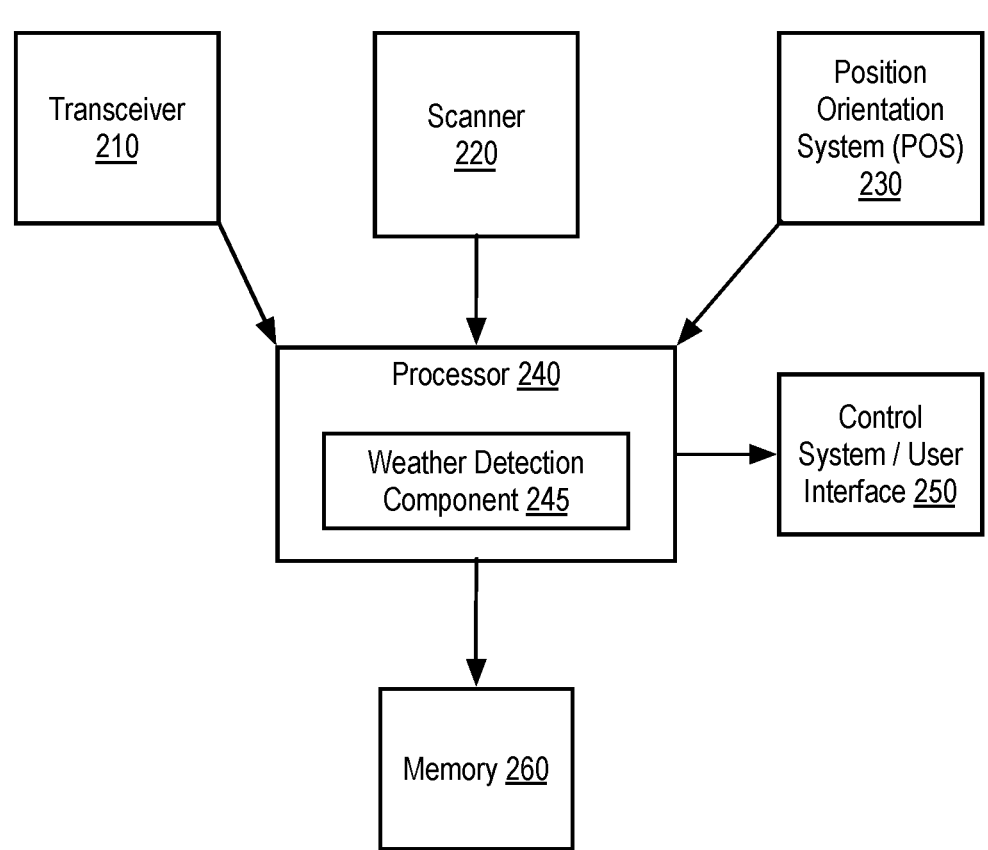
FIG. 2

300

<u>400</u>

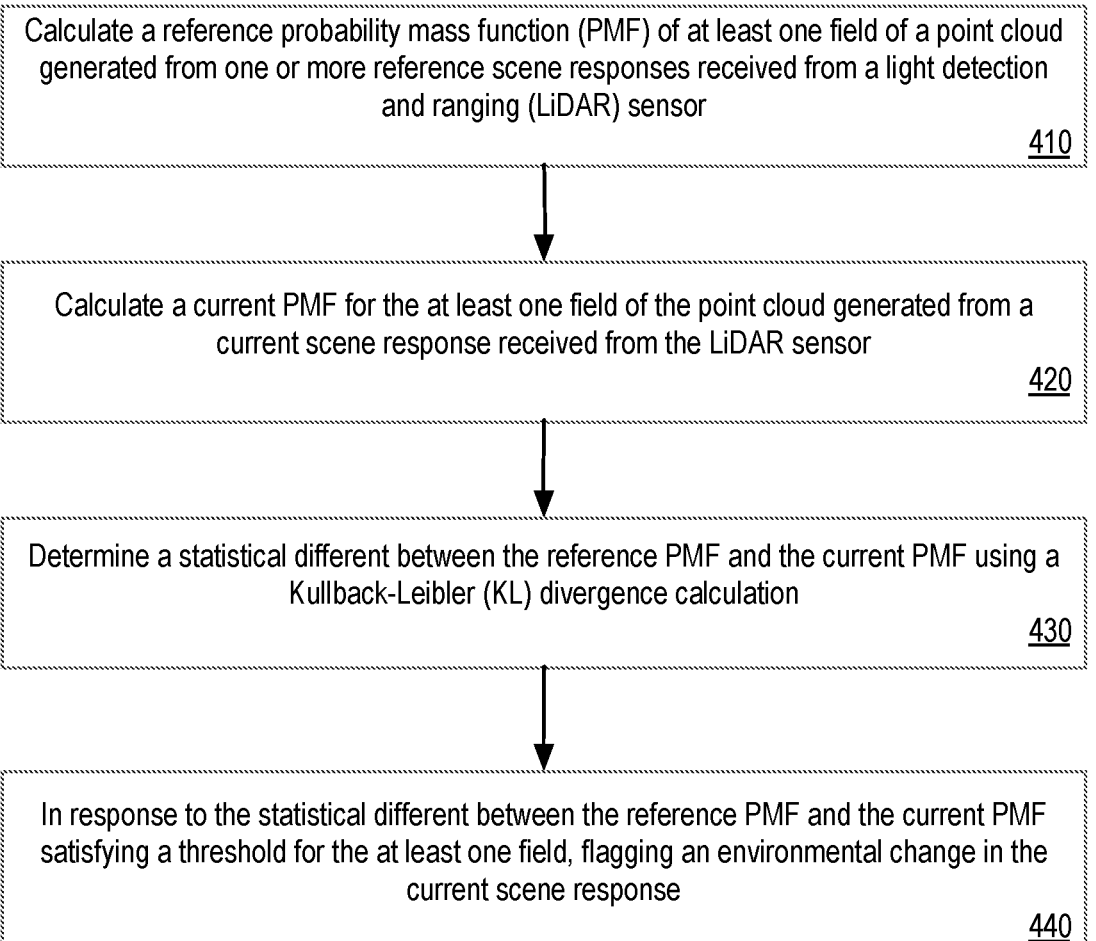

Calculate a reference probability mass function (PMF) of at least one field of a point cloud generated from one or more reference scene responses received from a light detection and ranging (LiDAR) sensor <u>410</u>

Calculate a current PMF for the at least one field of the point cloud generated from a current scene response received from the LiDAR sensor <u>420</u>

Determine a statistical different between the reference PMF and the current PMF using a Kullback-Leibler (KL) divergence calculation <u>430</u>

In response to the statistical different between the reference PMF and the current PMF satisfying a threshold for the at least one field, flagging an environmental change in the current scene response <u>440</u>

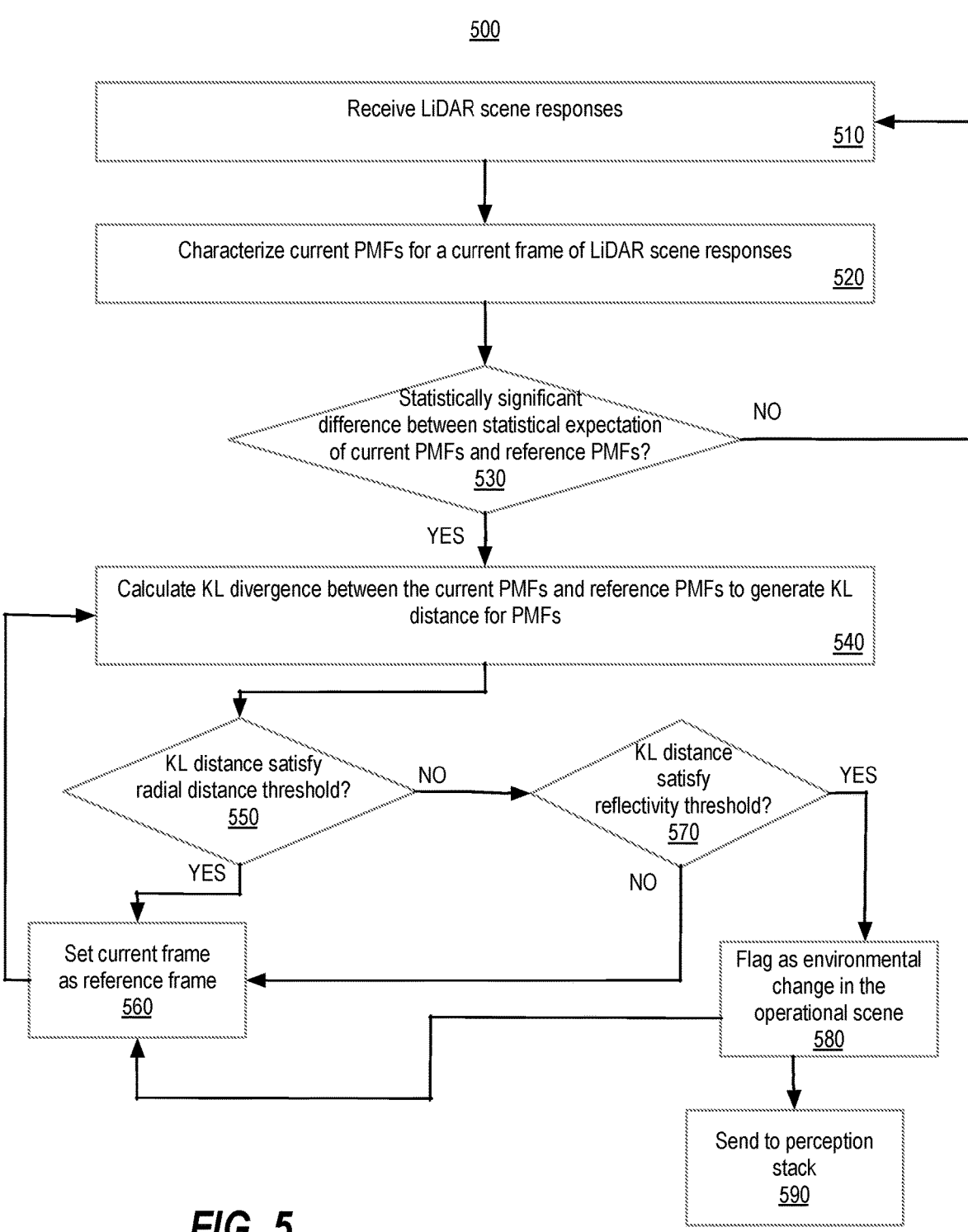

Receive LiDAR scene responses
510

Characterize current PMFs for a current frame of LiDAR scene responses
520

Statistically significant difference between statistical expectation of current PMFs and reference PMFs?
530

NO

YES

Calculate KL divergence between the current PMFs and reference PMFs to generate KL distance for PMFs
540

KL distance satisfy radial distance threshold?
550

NO

KL distance satisfy reflectivity threshold?
570

YES

YES

NO

Set current frame as reference frame
560

Flag as environmental change in the operational scene
580

Send to perception stack
590

*FIG. 5*

DETECTING ADVERSE WEATHER CONDITIONS AT A LIDAR SENSOR LEVEL

BACKGROUND

1. Technical Field

The disclosure generally relates to the field of processing systems and, more specifically, to detecting adverse weather conditions at a LiDAR sensor level.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

In some cases, autonomous vehicles may not be able to operate or may not operate well when encountering certain weather conditions in the autonomous vehicle's operational environment. Weather conditions such as rain (light rain, moderate rain, heavy rain), wet roads, fog, sleet, snow, hail, and so on, can cause the behavior of the autonomous vehicle to be modified. Such weather conditions may be referred to herein as adverse weather conditions as they result in reduced sensor and/or operational component performance of the autonomous vehicle. As such, the autonomous vehicle should provide for detection of various weather conditions of the operational environment of the autonomous vehicle.

BRIEF DESCRIPTION OF THE DRAWINGS

The various advantages and features of the disclosed technology will become apparent by reference to specific implementations illustrated in the appended drawings. A person of ordinary skill in the art will understand that these drawings only show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 2 illustrates a block diagram of a LiDAR system, a in accordance with embodiments herein;

FIG. 4 illustrates an example method for detection of adverse weather conditions at the LiDAR sensor level, in accordance with embodiments herein;

FIG. 5 illustrates an example method for utilizing Kullback-Leibler (KL) distance to detect adverse weather conditions at a LiDAR sensor, in accordance with embodiments herein;

DETAILED DESCRIPTION

Figure 1:
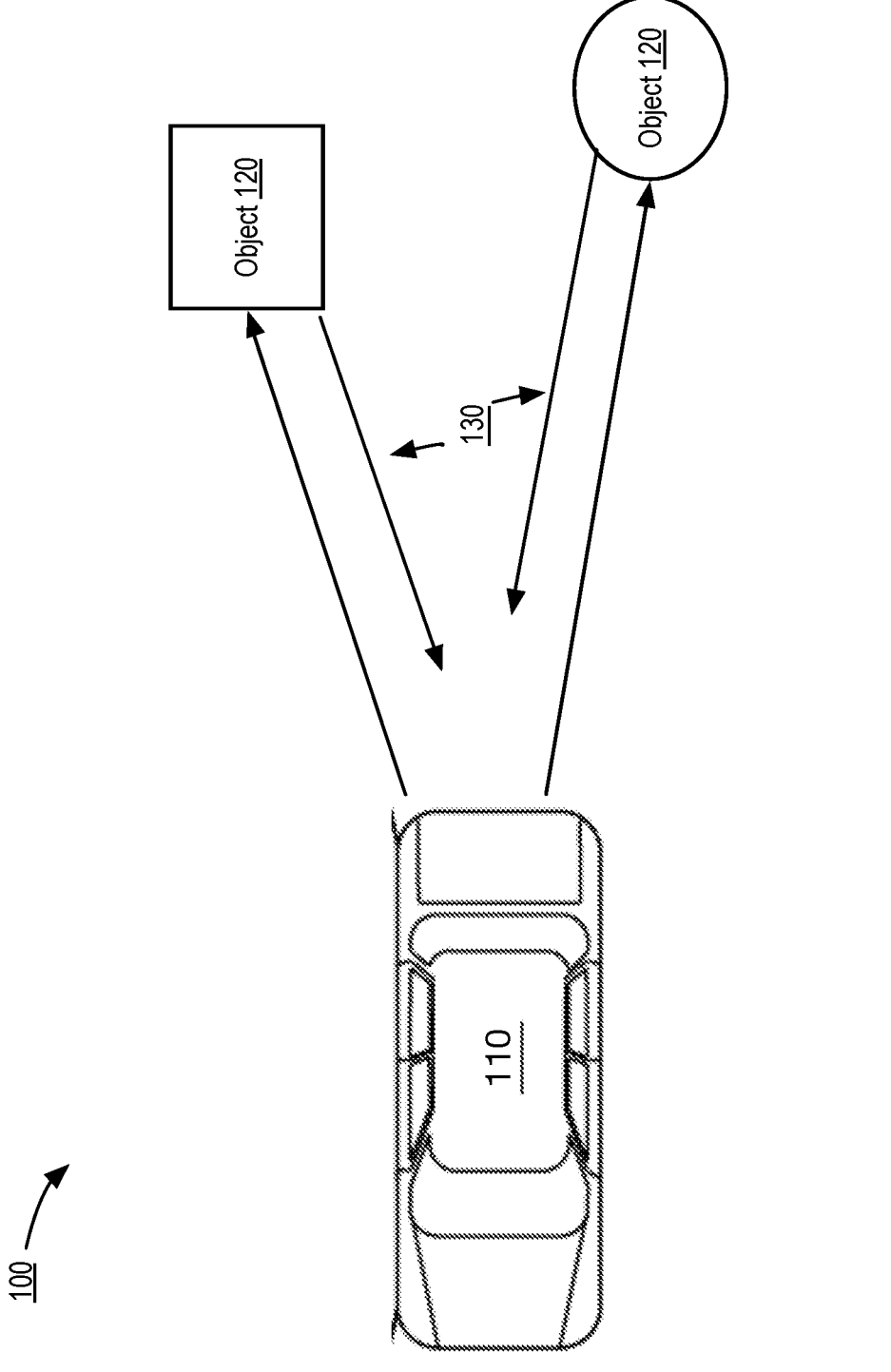
FIG. 1 is a block diagram of an example environment for detecting adverse weather conditions at a light detection and ranging (LiDAR) sensor level, in accordance with embodiments herein.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-haling (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

In some cases, AVs may not be able to operate or may not operate well when encountering certain weather conditions in the AV's operational environment. Weather conditions such as rain (light rain, moderate rain, heavy rain), wet roads, fog, sleet, snow, hail, and so on, can cause the behavior of the AV to be modified. Such weather conditions may be referred to herein as adverse weather conditions as they result in reduced sensor and/or operational component performance of the AV. As such, the AV should provide for detection of various weather conditions of the operational environment of the AV.

One conventional automotive approach to detection of weather conditions in an operational environment of the vehicle can include utilization of light-emitting diode (LED) sensors to detect a binary condition of raining or not raining. This approach provides for a limited set of detectable weather conditions (i.e., the two conditions of raining or not raining) and does not provide for finer granularity of weather detection responses. Furthermore, this approach utilizes a separate (sometimes dedicated) sensor device (e.g., the LED sensor) for the weather condition detection, introducing additional resources and complexity to the vehicle system.

Another approach for detection of weather conditions in AVs is to utilize the LiDAR sensor of the AV to provide performance characterization in adverse weather conditions by using datasets in a highly structured environment, such as a dedicated test facility. This approach is based on high sensitivity of current performance characterization techniques to scene variations and target location uncertainty caused by the simplicity of the analysis processes. However, as LiDAR sensor technology advances, this performance assessment model is a problem as it is particularly not well suited to determine performance degradation due to adverse weather conditions in an operational environment (as opposed to the highly structured environment). This is due to, for example, the operational environments being highly dynamic in the sense that of having a high degree of target variation and motion in the scene. Furthermore, LiDAR adverse weather characterization processes can utilize relatively long test distances (e.g., greater than 200 meters), which makes the creation of dedicated test facilities a cumbersome, difficult, and expensive undertaking, as space is a precious commodity.

Some approaches for detection of weather conditions in AVs may utilize artificial intelligence (AI)-based (e.g., machine learning) techniques to detect adverse weather conditions in the operational environment of the AV. However, such AI-based techniques utilize training sets and/or target models. Utilization of training sets and/or target models can require a substantial data collection effort and require significant processing resources and time, making the utilization of such AI-based techniques difficult and inefficient.

Embodiments herein address the above-described technical problems by providing systems and methods for detecting adverse weather conditions at a LiDAR sensor level. Embodiments herein utilize the existing sensors of the AV, such as the LiDAR sensor, to detect adverse weather conditions that may occur in the operational environment of the AV. In one embodiment, a LiDAR point cloud assessment algorithm is implemented that utilizes a statistical approach (i.e., does not utilize AI-based techniques so it does not have to be trained) and is capable of dealing with highly dynamic scenarios. In particular, during startup of the AV, the LiDAR point cloud assessment algorithm described herein collects one or more frames of LiDAR responses from the LiDAR sensor, wherein the frames correspond to LiDAR responses measured from a scanned scene of the AV. These frames provide a baseline reference for the AV and may be referred to herein as baseline frames, reference frames, or ensemble frames. A reference probability mass function (PMF) for one or more fields (metrics, such as radial distance, reflectivity, etc.) of the baseline frames is generated, where the reference PMF characterizes the baseline frames. As the AV continues to operate, a current frame of the AV is collected and a current PMF is generated over the fields (e.g., radial distance, reflectivity, etc.) of the current frame.

A statistical difference is then determined between the reference PMF and the current PMF for each of the fields (e.g., statistical difference between the reference PMF generated for the reflectivity field and the current PMF for the reflectivity field). In one embodiment, a Kullbeck-Leibler (KL) divergence calculation is utilized to estimate the statistical difference, referred to herein as a KL distance. The KL distance is a probabilistic way of calculating how different two probability regions are. The KL distance is calculated for each field in the point cloud that a PMF was generated for. The KL distance is then compared to one or more threshold values configured for each field. Based on the comparison, an adverse weather condition can be determined to be occurring and can be flagged to a perception layer (also referred to as a perception stack) of the AV. In some embodiments, based on the particular threshold that is satisfied for a field, a type of adverse weather condition may also be identified (e.g., light rain, moderate rain, heavy rain, etc.).

Embodiments herein provide for the technical advantages of not utilizing a training set as the baseline performance is done using a purely statistical approach and not a neural network architecture. As such, the performance of the LiDAR point cloud assessment techniques described herein can be deterministically adjusted. Furthermore, as the statistical characteristics of the test scene are used, no complex models are to be created to assess the performance of the LiDAR sensor when integrated with the vehicle platform. In addition, as the embodiments described herein are based on a statistical differential approach, they can adapt quickly to a dynamic environment. Lastly, due to the use of the statistical distance, the performance of the embodiments described herein can be highly resilient to outlier points.

Although some embodiments herein are described as operating in a LiDAR sensor implemented in an AV, other embodiments may be implemented in a LiDAR sensor operating in an environment that is not an AV, such as, for example, other types of vehicles (human operated, driver-assisted vehicles, etc.), air and terrestrial means of transport, or implemented on stationary or mobile devices (e.g., installed on a light pole or a building, handheld device, etc.) for use in applications such as surveying, geodesy, geomatics, archaeology, geography, geology, geomorphology, seismology, forestry, atmospheric physics, laser guidance, airborne laser swath mapping (ALSM), laser altimetry, and other monitoring and/or surveilling applications, to name a few examples. The following description discussed embodiments as implemented in an automotive environment, but one skilled in the art will appreciate that embodiments may be implemented in a variety of different LiDAR environments and use cases and are not limited to solely to the automotive environment. Further details of the detection of adverse weather conditions at the LiDAR sensor level of embodiments herein are further described below with respect to FIGS. 1-7.

FIG. 1 is a block diagram of an example environment 100 for detecting adverse weather conditions at a LiDAR sensor level, in accordance with embodiments herein. In one illustrative example, the environment 100 may include a vehicle 110 (which in some embodiments is fully autonomous while in other embodiments is a driver-assisted vehicle, etc.) that includes an operational LiDAR system. However, as noted above, the environment 100 may be include other use cases than automotive (vehicle 110), such as a stationary or mobile device that implements a LiDAR sensor. The LiDAR system has a transmitter that is operative to transmit pulsed light or lasers 130 away from the vehicle 110. Some of the pulsed light is incident on objects 120 around the vehicle 110. The vehicle 110 is also equipped with a processing device to process the returned signal from lasers 130 to measure amplitude, propagation time, and phase shift among other characteristics, in order to determine the distance to objects 120, as well as the size and velocity of the objects 120.

FIG. 2 illustrates a block diagram of a LiDAR system 200 according to one embodiment herein. In one embodiment, LiDAR system 200 is part of vehicle 110 described with respect to FIG. 1 and is referred to herein as automotive LiDAR system 200. In some embodiments, LiDAR system 200 is implemented on any type of stationary or mobile object or device, and is not solely limited to a vehicle use case. LiDAR system 200 may include one or more components including a transceiver 210, a scanner 22, a position orientation system (POS) 230, a processor 240, a control system/user interface (UI) 250, and/or a data storage device 260. More or less components than those illustrated and described herein may be included in LiDAR system 200 in embodiments herein.

Transceiver 210 is operative to generate a laser beam, transmit the laser beam, and capture the laser energy scattered/reflected from an object within a field of view (FOV) of the LIDAR system 200. In one example embodiment, LiDAR sensors employ time-of-flight (ToF) to determine the distance of objects from which the pulsed laser beams are reflected. The oscillating light signal is reflected off of the object and is detected by the detector within the transceiver 210 with a phase shift that depends on the distance that the object is from the sensor. An electronic phase lock loop (PLL) may be used to extract the phase shift from the signal and that phase shift is translated to a distance by known techniques. In some embodiments, the detector may also employ peak detection.

The scanner 220 is used to move the laser beam across the FOV of the LiDAR sensor. In one example, a rotational mirror is used to reflect a stationary laser across the FOV. In another example, a number of fixed lasers are pulsed in different directions in order to generated a FOV object model.

The POS 230 is used to accurately determine the time, position, and orientation of the scanner 220 when the laser is pulsed. The POS 230 system may include, for example, a global positioning system (GPS) sensor, inertial measurement system, and other sensors. The POS 230 may further be operative to determine a range measurement scan angle, sensor position, sensor orientation, and signal amplitude, for example. The data generated by the POS 230 may be combine with the data generated by the transceiver 210 in order to generate a FOV object model.

The system processor 240 is operative to transmit control signals to the transceiver 210, the POS 230, and the scanner 220 and receive data from these devices. The processors 240 receives the data and determines the location of objects within the FOV, and may determine other information such as velocity of objects, composition of objects, signal filtering, etc. The data storage device 260 may provide memory that is operative to store digital representations of returned signal pulses, and/or to store data calculated by the processor 240.

The control system/UI 250 is operative to receive inputs from a user, to display results, and optionally to generate vehicle control signals in response to data generated by the processor 240. Vehicle control signals may be used to control a vehicle, may be used for collision avoidance, or may be used for a driver warning system, among other uses.

In embodiments herein, the processor 240 can process data received from the devices to perform detection of adverse weather conditions at the LiDAR system 200. In embodiments herein, the processor 240 can include a weather detection component 245 for implementing techniques for detection of adverse weather conditions at the LiDAR sensor level, as described herein. Further details of the techniques discussed above for detection of adverse weather conditions at the LiDAR sensor level that are implemented by the weather detection component 245 are described in greater detail below with respect to FIGS. 3-5.

Figure 3:
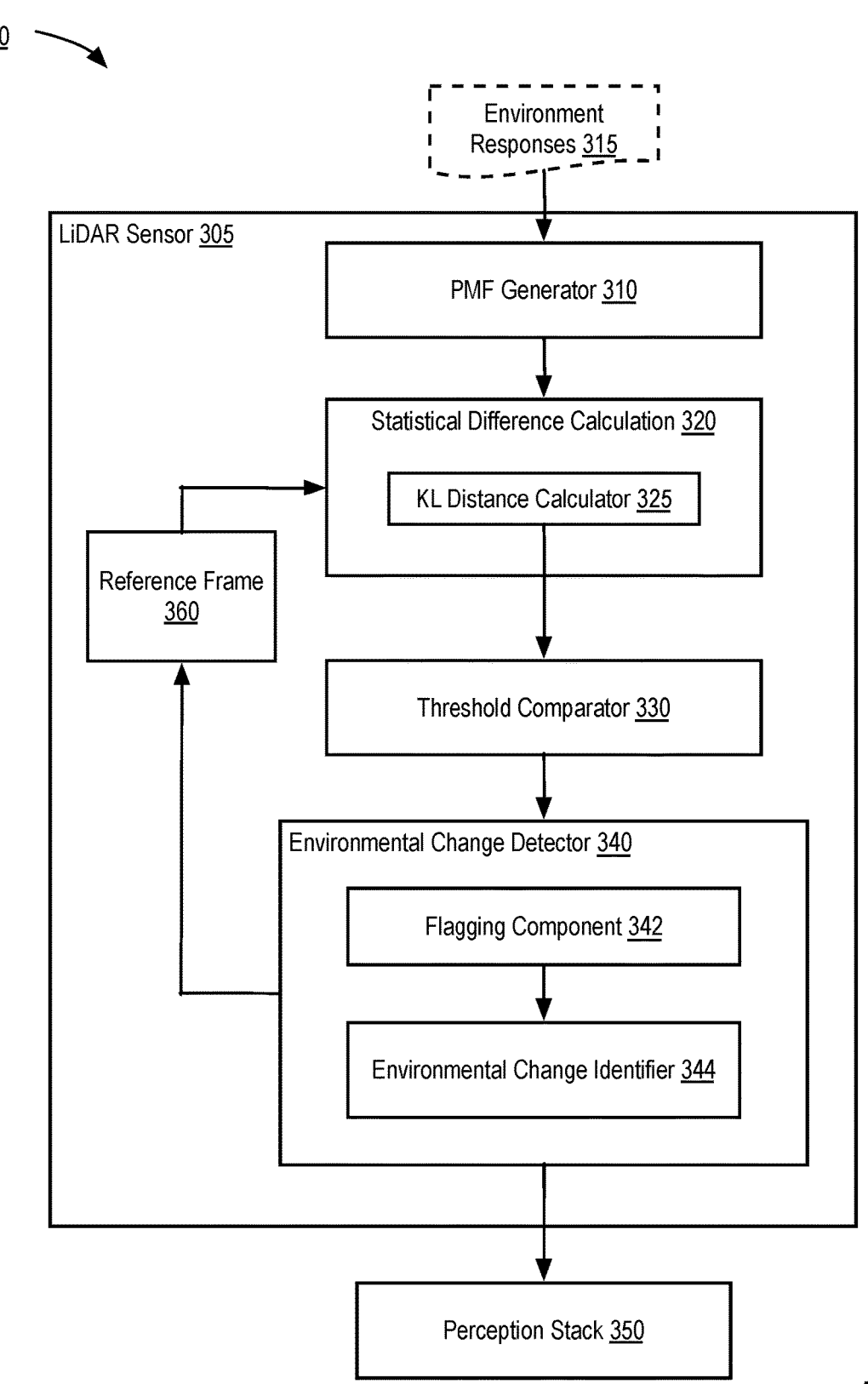
FIG. 3 illustrates a functional block diagram for a LiDAR sensor weather detection system that provides operations for detection of adverse weather conditions at the LiDAR sensor level, in accordance with an embodiment herein.

FIG. 3 illustrates a functional block diagram for a LiDAR sensor weather detection system 300 that provides operations for detection of adverse weather conditions at the LiDAR sensor level, in accordance with an embodiment herein. In one embodiment, LiDAR sensor weather detection system 300 is part of automotive LiDAR system 200 described with respect to FIG. 2. In one embodiment, the LiDAR sensor weather detection system 300 is implemented in a vehicle (e.g., an autonomous vehicle (AV), which in some embodiments is fully autonomous while in other embodiments is a driver-assisted vehicle, etc.). In some embodiments, LiDAR system 200 is implemented on any type of stationary or mobile object or device, and is not solely limited to a vehicle use case.

In embodiments herein, the LiDAR sensor weather detection system 300 may include a LiDAR sensor 305. The LiDAR sensor 305 may include hardware, software, firmware, or some combination of the above to provide for detecting adverse weather conditions using the LiDAR sensor 305. Embodiments herein utilize the LiDAR sensor 305 to detect adverse weather conditions that may occur in the operational environment of the AV. In one embodiment, the LiDAR sensor 305 implements a LiDAR point cloud assessment technique that utilizes a statistical approach (i.e., does not utilize AI-based techniques so it does not have to be trained) and is capable of dealing with highly dynamic scenarios.

The LiDAR point cloud assessment technique of LiDAR sensor 305 initiates during startup of the AV. One or more frames of LiDAR responses, illustrated as environment responses 315 in FIG. 3, are collected by the LiDAR sensor 305. The frames correspond to LiDAR responses measured from a scanned scene around the AV. These frames provide a baseline reference for the AV and may be referred to herein as baseline frames, reference frames, or ensemble frames. The frames may be processed by LiDAR sensor 305 to generate a sensor point cloud. The sensor point cloud can include sensor point cloud data, where each point of the point cloud data may comprise one or more fields (or metrics), including an X, Y coordinate, reflectivity (intensity), color, time, and so on. In some cases, the point cloud data can be processed to identify one or more targets (objects) of interest in the scanned scene.

A PMF generator 310 of LiDAR sensor 305 can generate a reference PMF for one or more fields (metrics, such as radial distance, reflectivity, etc.) of the baseline frames, where the reference PMF characterizes the baseline frames. In some embodiments, the number of baseline frames can be one or more. The number of frames may be predetermined and configured in the LiDAR sensor 305 to set the performance baseline. If the number of frames for the baseline is greater than one, the values of the fields over the frames can be averaged together for purposes of generating the reference PMF. In embodiments here, the PMFs are generated over the field's entire point cloud data from the frame, and as such, provides an overall measurement of the field within the frame(s).

As discussed herein, a first reference PMF is generated for the radial distance field and a second reference PMF is generated for the reflectivity field. However, embodiments herein are not solely limited to those fields and can be expanded to include other fields of the sensor point cloud. The PMF refers to a function that gives the probability that a discrete random variable is exactly equal to some value, and provides the possible values and their associated probabilities. In some embodiments, these reference PMFs can be denoted as p (A, r) and p (A, σ), where A represent the reference frame(s), r represents radial distance, and a represents reflectivity The reference PMF(s) for each field (i.e., radial distance, reflectivity) are then passed to a statistical difference calculation component 320 of the LiDAR sensor 305.

As the AV continues to operate, sensor point cloud data continues to be generated by the LiDAR sensor 305 and further processed via ingestion by the processor or PMF generator 310. From the sensor point cloud data, a current frame, denoted as frame t, is collected by the PMF generator 310. The PMF generator 310 characterizes the current PMF of the radial distances and reflectivities of the targets located in the angular span [$\theta$s, $\theta$e] and the beam span [bs, be] of the current frame. In some embodiments, these current PMFs can be denoted as p (t, r) and p (t, $\sigma$), where r represents radial distance, and a represents reflectivity. The current PMFs for the fields (radial distance, reflectivity) are then passed to the statistical difference calculation component 320.

The statistical difference calculation component 320 may process the received PMFs (reference and current) to identify whether statistical difference exist between the reference frame(s) and the current frame. In one embodiment, statistical difference calculation component 320 may first calculate a statistical expectation (average) for the reference and current PMFs. In one embodiment, the statistical expectation can be represented as E {p (A, $\sigma$)} and E {p (A, r)} for the reference PMFs, and E {p (t, $\sigma$)} and E {p (t, r)} for the current frame, where E { } denotes statistical expectation.

If there is a statistical significance of the differences between the statistical expectations, E, calculated for the reference PMFs and current PMFs in reflectivity (r) and radial distance (a) between the current and reference PMFs, then a change is determined to have taken place. In this case, the statistical difference calculation component 320 utilize the KL distance calculator 325, as discussed further below. On the other hand, if no change is identified (i.e., no statistically significant difference determined) between the statistical expectations, E, for the PMFs, then no change is determined to have taken place and the PMF generator continues ingesting frames of the sensor point cloud.

If a determined change between statistical expectations (E) is identified, the KL distance calculator 325 is implemented to calculate a KL divergence between the differences in reflectivity (r) and radial distance (a) between the current and reference frames. As part of this process, the last compliant frame is set as the reference frame 360, and its PMF values are stored as p (A, $\sigma$) and p (A, r). Then, the KL divergence is calculated to determine the difference (KL distance) between the PMFs (reference PMFs and current PMFs) as follows, for example:

$$D_\sigma = \sum_{\sigma \in \Theta} p(t, \sigma) \cdot \log \left( \frac{p(A, \sigma)}{p(t, \sigma)} \right) \tag{1}$$

$$D_r = \sum_{r \in R} p(t, r) \cdot \log \left( \frac{p(A, r)}{p(t, r)} \right) \tag{2}$$

In the equation above, equation (1) represents the KL divergence calculation for the reflectivity PMF producing KL distance $D_\sigma$ for reflectivity, and equation (2) represents the KL divergence calculation for the radial distance PMF producing KL distance $D_r$ for radial distance. The KL divergence is a common metric to measure the difference between two statistical distributions. It allows for reliably measuring a consistent reflectivity and radial distance differences between the targets in the reference and the current frames.

The calculated KL distances are then passed to the threshold comparator 330. The threshold comparator 330 compares the KL distance to one or more threshold values configured for each field. For example, the following comparison may be performed:

$$D_\sigma > \alpha_\sigma \tag{3}$$

$$D_r > \alpha_r \tag{4}$$

where $\alpha_\sigma$ is the KL distance threshold for the reflectivity PMFs, and $\alpha_r$ is the KL distance threshold for the radial distance PMFs. In embodiments herein, the estimation of $\alpha_\sigma$ and $\alpha_r$ can be subject to actual tuning of the algorithm using the different stages. In some embodiments, more than one threshold may be configured for a particular field. For example, multiple threshold values $\alpha_\sigma 1$, $\alpha_\sigma 2$, ..., $\alpha_\sigma N$ may be configured for the reflectivity PMFs, where each threshold value corresponds to a different weather condition. The results of the comparisons at threshold comparator 330 may be passed to an environmental change detector 340.

Based on the comparison, the environmental change detector 340 can determine whether an adverse weather condition is occurring. In one embodiment, a flagging component 342 can flag occurrence of an adverse weather condition to a perception stack 350 (also referred to as a perception layer) of the AV. In some embodiments, based on the particular threshold that is satisfied for a field, an environmental change identifier 344 can identify a type of adverse weather condition that is occurring (e.g., light rain, moderate rain, heavy rain, etc.) and also pass that information on to the perception stack 350.

In one example, depending on the results of the comparison, three courses of action can be taken at the environmental change detector 340. In a first scenario, if no change is detected in reflectivity and distance, then no action is taken. In a second scenario, if changes in both distance and reflectivity are detected, then a change in the morphology of the operating scenario is determined and the new frame is used as the basis of a new reference frame 360. In this scenario, the change in the distance indicates a new target may have entered the scene, causing the changes in reflectivity. Thus, further assessment of the distance and reflectivity PMFs is to be performed to detect adverse weather conditions, and the current frame is set as the reference frame to allow this further assessment to occur (and detection/flagging of environmental change such as adverse weather conditions is skipped in this scenario).

In a third scenario, if a change is detected only on the reflectivity (and not distance), then the dataset is flagged as an environmental change operational scenario by the flagging component 342. In this case, the lack of change in distance indicates that new objects are not causing the reflectivity changes and thus it is likely that an environmental change (e.g., weather) is affecting the reflectivity values. As such, the current frame is used as the basis of a new reference frame 360, and the evaluation is passed to the perception stack by flagging component 342 and/or environmental change identifier 344.

FIG. 4 illustrates an example method 400 for detection of adverse weather conditions at the LiDAR sensor level, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a reference PMF is generated. The reference PMF is generated for at least one field of a point cloud, where the point cloud is generated from reference scene responses received from a LiDAR sensor. The PMF refers to a function that gives the probability that a discrete random variable is exactly equal to some value, and provides the possible values and their associated probabilities. In one embodiment, the at least one field may be a radial distance field of the point cloud data and a reflectivity field of the point cloud data.

At block 420, a current PMF is calculated for the at least one field of the point cloud generated from a current scene response received from the LiDAR sensor. For example, the current PMF may be generated from fields of point cloud data corresponding to a current frame of the LiDAR scene response. In one embodiment, the current PMF can be generated for radial distance and reflectivity field.

Subsequently, at block 430, a statistical difference between the reference PMF and the current PMF is determined using a KL divergence calculation. In one embodiment, the KL divergence calculation is a common metric to measure the difference between two statistical distributions. It allows for reliably measuring a consistent reflectivity and radial distance differences between the targets in the reference and the current frames.

Lastly, at block 440, in response to the statistical difference satisfying a threshold for the at least one field, an environmental change is flagged in the current scene response. The KL distance is then compared to one or more threshold values configured for each field. In one embodiment, based on a comparison between the KL distance and a determined threshold value, an adverse weather condition can be determined to be occurring and can be flagged to a perception layer (also referred to as a perception stack) of the AV. In some embodiments, based on the particular threshold that is satisfied for a field, a type of adverse weather condition may also be identified (e.g., light rain, moderate rain, heavy rain, etc.).

FIG. 5 illustrates an example method 500 for utilizing KL distance to detect adverse weather conditions at a LiDAR sensor, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a LiDAR scene response is received. The LiDAR scene response may be a point cloud generated from a LiDAR sensor scanning a scene. The point cloud may include a set of point cloud data, where each point of the point cloud data may comprise one or more fields (or metrics), including an X, Y coordinate, reflectivity (intensity), color, time, and so on. In some cases, the point cloud data can be processed to identify one or more targets (objects) of interest in the scanned scene.

At block 520, current PMFs are characterized for a current frame of LiDAR scene responses. The PMF refers to a function that gives the probability that a discrete random variable is exactly equal to some value, and provides the possible values and their associated probabilities. In one embodiment, the PMFs are generated for the point cloud fields of radial distance reflectivity.

At decision block 530, it is determined whether there is a statistically significant difference between statistical expectations of the current PMFs and reference PMFs. In one embodiment, the reference PMFs may be PMFs generated for one or more previous frames of the point cloud data for the LiDAR scene responses. The statistical expectation may refer to an average of the PMFs. If a statistically significant difference is not determined, then method 500 returns to block 510 to continue receiving (ingesting) LiDAR scene response.

On the other hand, if a statistically significant difference is determined at decision block 530, then method 500 proceeds to block 540, where a KL divergence is calculated between the current PMFs and the reference PMFs in order to generate KL distances for PMFs. The KL divergence calculation is a common metric to measure the difference between two statistical distributions. It allows for reliably measuring a consistent reflectivity and radial distance differences between the targets in the reference and the current frames. At decision block 550, it is determined whether the KL distance (for the radial distance PMFs) satisfies a radial distance threshold. In one embodiment, the radial distance threshold is predetermined and configured in the LiDAR system. If KL distance (for the radial distance PMFs) does satisfy the radial distance threshold, then the current frame is set as a reference frame at block 560.

On the other hand, if the KL distance (for the radial distance PMFs) does not satisfy the radial distance threshold, then method 500 proceeds to decision block 570. At decision block 570, it is determined whether the KL distance (for the reflectivity PMFs) satisfies a reflectivity threshold. If not, then method 500 proceeds to block 560 to set the current frame as the reference frame.

On the other hand, if the KL distance (for the reflectivity PMFs) is satisfied at decision block 570, then method 500 proceeds to block 580 where an environmental change in the operational scene is flagged. Then, at block 590, the environmental change flag is sent to perception stack. In some embodiments, a type of the environmental change may also be determined based on the threshold comparison and this identified type of environmental change (e.g., light rain, moderate rain, heavy rain, snow, fog, etc.) can also be sent to the perception stack.

Figure 6:
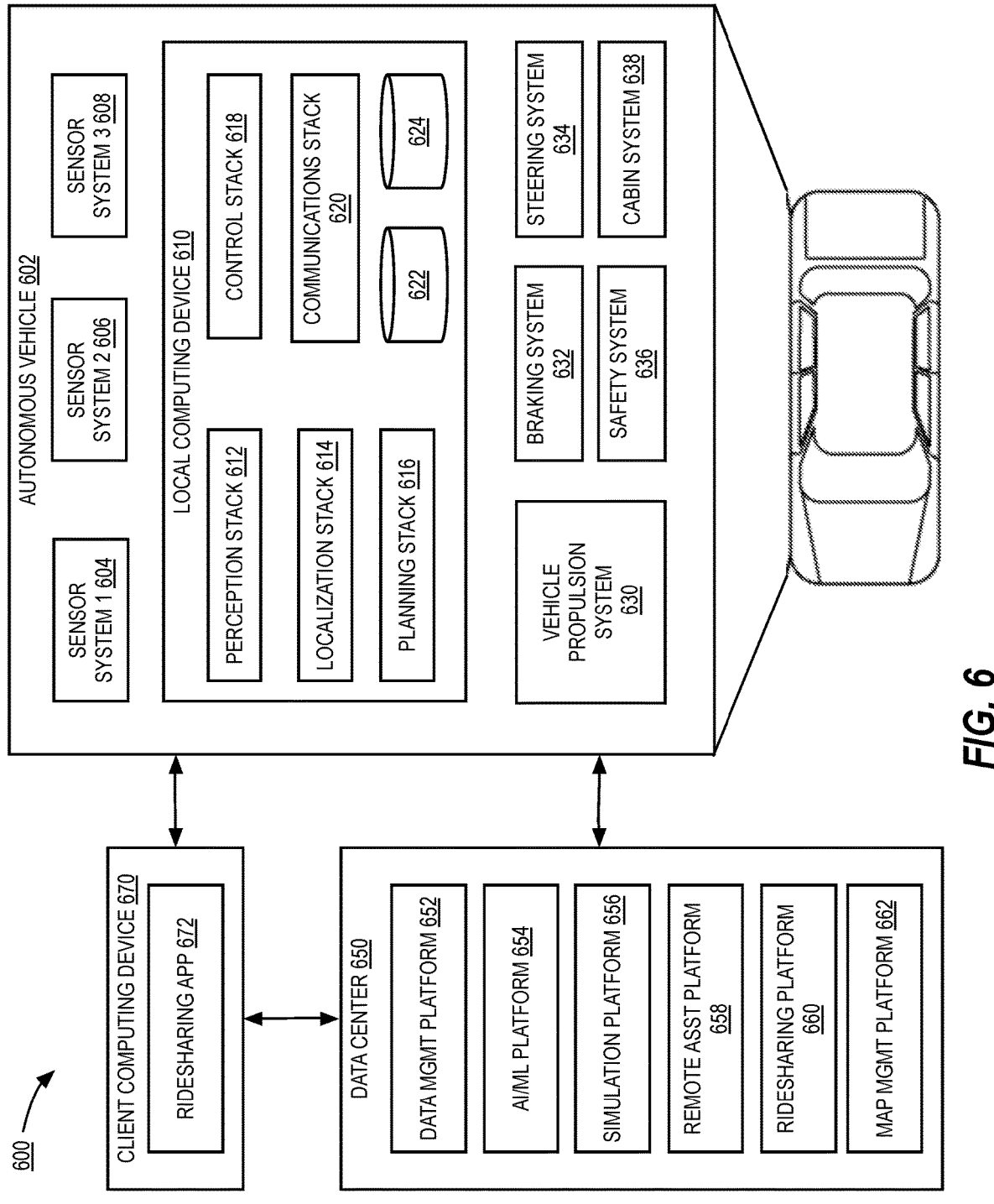
FIG. 6 illustrates an example of an autonomous vehicle (AV) management system, according to some aspects of the disclosed technology.

Turning now to FIG. 6, this figure illustrates an example of an AV management system 600. In one embodiment, the AV management system 600 can implement detection of adverse weather conditions at the LiDAR sensor level, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
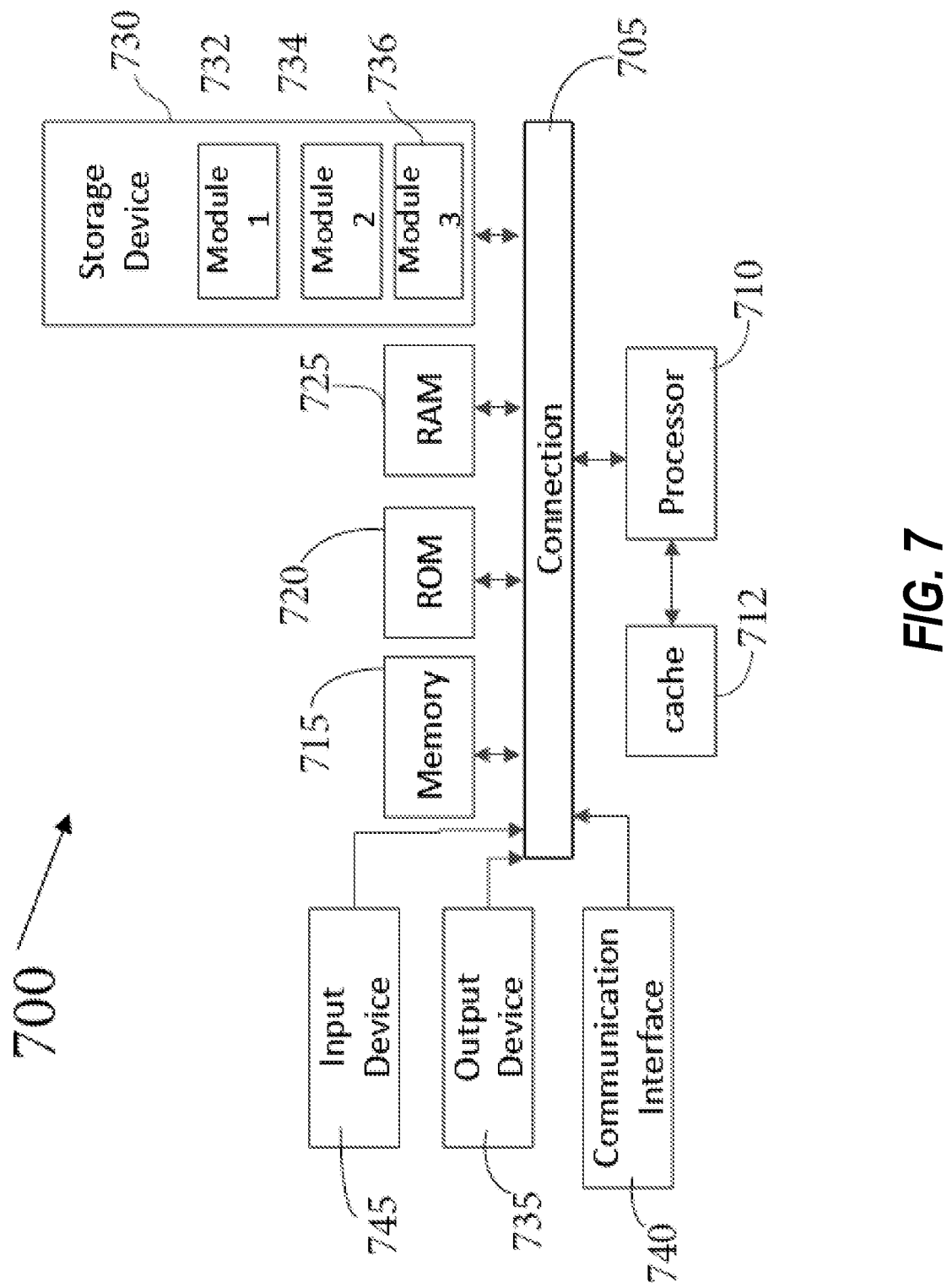
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/ plug, a microphone jack/plug, a Universal Serial Bus (USB) port/plug, an Apple® Lightning® port/plug, an Ethernet port/plug, a fiber optic port/plug, a proprietary wired port/ plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the hardware components, such as processor 710, connection 705, output device 735, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method comprising: calculating a reference probability mass function (PMF) of at least one field of a point cloud generated from reference scene responses received from a light detection and ranging (LiDAR) sensor; calculating a current PMF for the at least one field of the point cloud generated from a current scene response received from the LiDAR sensor; determining a statistical difference between the reference PMF and the current PMF using a Kullback-Leibler (KL) divergence calculation; and responsive to the statistical difference satisfying a threshold for the at least one field, flagging an environmental change in the current scene response.

In Example 2, the subject matter of Example 1 can optionally include wherein the at least one field comprises a reflectivity field or a radial distance field. In Example 3, the subject matter of any one of Examples 1-2 can optionally include wherein the environmental change comprises an adverse weather condition. In Example 4, the subject matter of any one of Examples 1-3 can optionally include wherein the threshold is one of a plurality of thresholds, with each threshold of the plurality of thresholds corresponding to a particular weather condition.

In Example 5, the subject matter of any one of Examples 1-4 can optionally include further comprising identifying the particular weather condition that corresponds to the threshold of the plurality of thresholds that is satisfied. In Example 6, the subject matter of any one of Examples 1-5 can optionally include wherein the particular weather conditions comprise at least one of light rain, moderate rain, heavy rain, sleet, hail, or snow. In Example 7, the subject matter of any one of Examples 1-6 can optionally include wherein the reference scene responses comprise an average of the at least one field over a plurality of previous scene responses.

In Example 8, the subject matter of any one of Examples 1-7 can optionally include wherein the at least one field comprises a reflectivity field and a radial distance field, and wherein in response to the current PMF for the distance field being above the threshold corresponding to the distance field, skipping the flagging of the environmental change. In Example 9, the subject matter of any one of Examples 1-8 can optionally include wherein the at least one field comprises a reflectivity field and a radial distance field, and wherein in response to the current PMF for the distance field being below the threshold corresponding to the distance field, and the current PMF for the reflectivity field being above the threshold corresponding to the reflectivity field, flagging the environmental change. In Example 10, the subject matter of any one of Examples 1-9 can optionally include wherein the LiDAR sensor is comprised in an autonomous vehicle (AV).

Example 11 includes an apparatus comprising one or more hardware processors to: calculate a reference probability mass function (PMF) of at least one field of a point cloud generated from reference scene responses received from a light detection and ranging (LiDAR) sensor; calculate a current PMF for the at least one field of the point cloud generated from a current scene response received from the LiDAR sensor; determine a statistical difference between the reference PMF and the current PMF using a Kullbeck-Leibler (KL) divergence calculation; and responsive to the statistical difference satisfying a threshold for the at least one field, flag an environmental change in the current scene response.

In Example 12, the subject matter of Example 11 can optionally include wherein the environmental change comprises an adverse weather condition. In Example 13, the subject matter of Examples 11-12 can optionally include wherein the threshold is one of a plurality of thresholds, with each threshold of the plurality of thresholds corresponding to a particular weather condition, and wherein the one or more processors are further to identify the particular weather condition that corresponds to the threshold of the plurality of thresholds that is satisfied.

In Example 14, the subject matter of Examples 10-13 can optionally include wherein the at least one field comprises a reflectivity field and a radial distance field, and wherein in response to the current PMF for the distance field being above the threshold corresponding to the distance field, the one or more processors are to skip the flagging of the environmental change. In Example 15, the subject matter of Examples 10-14 can optionally include wherein the at least one field comprises a reflectivity field and a radial distance field, and wherein in response to the current PMF for the distance field being below the threshold corresponding to the distance field, and the current PMF for the reflectivity field being above the threshold corresponding to the reflectivity field, the one or more processors are to flag the environmental change.

Example 16 is a non-transitory computer-readable storage medium for facilitating detecting weather conditions at a LiDAR sensor level. The non-transitory computer-readable storage medium of Example 16 having stored thereon executable computer program instructions that, when executed by one or more processors, cause the one or more processors to: calculate a reference probability mass function (PMF) of at least one field of a point cloud generated from reference scene responses received from a light detection and ranging (LiDAR) sensor; calculate a current PMF for the at least one field of the point cloud generated from a current scene response received from the LiDAR sensor; determine a statistical difference between the reference PMF and the current PMF using a Kullbeck-Leibler (KL) divergence calculation; and responsive to the statistical difference satisfying a threshold for the at least one field, flag an environmental change in the current scene response.

In Example 17, the subject matter of Example 16 can optionally include wherein the environmental change comprises an adverse weather condition, and wherein the threshold is one of a plurality of thresholds, with each threshold of the plurality of thresholds corresponding to a particular weather condition. In Example 18, the subject matter of Examples 16-17 can optionally include wherein the one or more processors are further to identify the particular weather condition that corresponds to the threshold of the plurality of thresholds that is satisfied.

In Example 19, the subject matter of Examples 16-18 can optionally include wherein the at least one field comprises a reflectivity field and a radial distance field, and wherein in response to the current PMF for the distance field being above the threshold corresponding to the distance field, the one or more processors are to skip the flagging of the environmental change. In Example 20, the subject matter of Examples 16-19 can optionally include wherein the at least one field comprises a reflectivity field and a radial distance field, and wherein in response to the current PMF for the distance field being below the threshold corresponding to the distance field, and the current PMF for the reflectivity field being above the threshold corresponding to the reflectivity field, the one or more processors are to flag the environmental change.

Example 21 is a system for facilitating detecting weather conditions at a LiDAR sensor level. The system of Example 21 can optionally include a memory to store a block of data, and a processor communicably coupled to the memory, wherein the processor is to: calculate a reference probability mass function (PMF) of at least one field of a point cloud generated from reference scene responses received from a light detection and ranging (LiDAR) sensor of an autonomous vehicle (AV); calculate a current PMF for the at least one field of the point cloud generated from a current scene response received from the LiDAR sensor; determine a statistical difference between the reference PMF and the current PMF using a Kullbeck-Leibler (KL) divergence calculation; and responsive to the statistical difference satisfying a threshold for the at least one field, flag an environmental change in the current scene response.

In Example 22, the subject matter of Example 21 can optionally include wherein the environmental change comprises an adverse weather condition. In Example 23, the subject matter of Examples 21-22 can optionally include wherein the threshold is one of a plurality of thresholds, with each threshold of the plurality of thresholds corresponding to a particular weather condition. In Example 24, the subject matter of Examples 21-23 can optionally include wherein the one or more processors are further to identify the particular weather condition that corresponds to the threshold of the plurality of thresholds that is satisfied.

In Example 25, the subject matter of Examples 21-24 can optionally include wherein the at least one field comprises a reflectivity field and a radial distance field, and wherein in response to the current PMF for the distance field being above the threshold corresponding to the distance field, the one or more processors are to skip the flagging of the environmental change. In Example 26, the subject matter of Examples 21-25 can optionally include wherein the at least one field comprises a reflectivity field and a radial distance field, and wherein in response to the current PMF for the distance field being below the threshold corresponding to the distance field, and the current PMF for the reflectivity field being above the threshold corresponding to the reflectivity field, the one or more processors are to flag the environmental change.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating detecting weather conditions at LiDAR sensor level, configured to perform the method of any one of Examples 1-9. Specifics in the Examples may be used anywhere in one or more embodiments.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
calculating a reference probability mass function (PMF) for each of a reflectivity field and a radial distance field of a point cloud generated from reference scene responses received from a light detection and ranging (LiDAR) sensor;
calculating a current PMF for each of the reflectivity field and the radial distance field of the point cloud generated from a current scene response received from the LiDAR sensor;
determining, for each of the reflectivity field and the radial distance field, a statistical difference between the reference PMF and the current PMF using a Kullbeck-Leibler (KL) divergence calculation; and
responsive to a KL divergence for the reflectivity field exceeding a threshold corresponding to the reflectivity field and a KL divergence for the radial distance field being below a threshold corresponding to the radial distance field, flagging an environmental change in the current scene response.

2. The method of claim 1, wherein the environmental change comprises an adverse weather condition.

3. The method of claim 1, wherein the threshold is one of a plurality of thresholds, with each threshold of the plurality of thresholds corresponding to a particular weather condition.

4. The method of claim 3, further comprising identifying the particular weather condition that corresponds to the threshold of the plurality of thresholds that is satisfied.

5. The method of claim 3, wherein the particular weather conditions comprise at least one of light rain, moderate rain, heavy rain, sleet, hail, or snow.

6. The method of claim 1, wherein the reference scene responses comprise an average of the reflectivity field and the radial distance field over a plurality of previous scene responses.

7. The method of claim 1, wherein in response to the KL divergence for the radial distance field exceeding the threshold corresponding to the radial distance field, skipping the flagging of the environmental change.

8. The method of claim 1, wherein the LiDAR sensor is comprised in an autonomous vehicle (AV).

9. The method of claim 1, further comprising, prior to determining the statistical difference using the Kullbeck-Leibler (KL) divergence calculation, calculating a statistical expectation for the reference PMF and the current PMF for each of the reflectivity field and the radial distance field, and proceeding with the KL divergence calculation only when a statistically significant difference between the statistical expectations is identified.

10. The method of claim 1, wherein in response to the KL divergence for the radial distance field exceeding the threshold corresponding to the radial distance field and the KL divergence for the reflectivity field exceeding the threshold corresponding to the reflectivity field, setting a current frame as a reference frame and skipping the flagging of the environmental change.

11. An apparatus comprising:
one or more hardware processors to:
calculate a reference probability mass function (PMF) for each of a reflectivity field and a radial distance field of a point cloud generated from reference scene responses received from a light detection and ranging (LiDAR) sensor;
calculate a current PMF for each of the reflectivity field and the radial distance field of the point cloud generated from a current scene response received from the LiDAR sensor;
determine, for each of the reflectivity field and the radial distance field, a statistical difference between the reference PMF and the current PMF using a Kullbeck-Leibler (KL) divergence calculation; and
responsive to a KL divergence for the reflectivity field exceeding a threshold corresponding to the reflectivity field and a KL divergence for the radial distance field being below a threshold corresponding to the radial distance field, flag an environmental change in the current scene response.

12. The apparatus of claim 11, wherein the environmental change comprises an adverse weather condition.

13. The apparatus of claim 11, wherein the threshold is one of a plurality of thresholds, with each threshold of the plurality of thresholds corresponding to a particular weather condition, and wherein the one or more processors are further to identify the particular weather condition that corresponds to the threshold of the plurality of thresholds that is satisfied.

14. The apparatus of claim 11, wherein in response to a KL divergence for the radial distance field exceeding the threshold corresponding to the radial distance field, the one or more processors are to skip the flagging of the environmental change.

15. The apparatus of claim 11, wherein in response to a KL divergence for the radial distance field being below the threshold corresponding to the radial distance field, and a KL divergence for the reflectivity field exceeding the threshold corresponding to the reflectivity field, the one or more processors are to flag the environmental change.

16. A non-transitory computer-readable medium having stored thereon instructions that, when executed by one or more processors, cause the one or more processors to:

calculate a reference probability mass function (PMF) for each of a reflectivity field and a radial distance field of a point cloud generated from reference scene responses received from a light detection and ranging (LiDAR) sensor;

calculate a current PMF for each of the reflectivity field and the radial distance field of the point cloud generated from a current scene response received from the LiDAR sensor;

determine, for each of the reflectivity field and the radial distance field, a statistical difference between the reference PMF and the current PMF using a Kullbeck-Leibler (KL) divergence calculation; and responsive to a KL divergence for the reflectivity field exceeding a threshold corresponding to the reflectivity field and a KL divergence for the radial distance field being below a threshold corresponding to the radial distance field, flag an environmental change in the current scene response.

17. The non-transitory computer-readable medium of claim 16, wherein the environmental change comprises an adverse weather condition, and wherein the threshold is one of a plurality of thresholds, with each threshold of the plurality of thresholds corresponding to a particular weather condition.

18. The non-transitory computer-readable medium of claim 17, wherein the one or more processors are further to identify the particular weather condition that corresponds to the threshold of the plurality of thresholds that is satisfied.

19. The non-transitory computer-readable medium of claim 16, wherein in response to a KL divergence for the radial distance field exceeding the threshold corresponding to the radial distance field, the one or more processors are to skip the flagging of the environmental change.

20. The non-transitory computer-readable medium of claim 16, wherein in response to a KL divergence for the radial distance field being below the threshold corresponding to the radial distance field, and a KL divergence for the reflectivity field exceeding the threshold corresponding to the reflectivity field, the one or more processors are to flag the environmental change.

* * * * *